US011818986B1

(12) United States Patent
Sprowl

(10) Patent No.: US 11,818,986 B1
(45) Date of Patent: Nov. 21, 2023

(54) GROWING DEVICE

(71) Applicant: Bruce Sprowl, Valparaiso, IN (US)

(72) Inventor: Bruce Sprowl, Valparaiso, IN (US)

( * ) Notice: Subject to any disclaimer, the term of this patent is extended or adjusted under 35 U.S.C. 154(b) by 323 days.

(21) Appl. No.: 17/172,832

(22) Filed: Feb. 10, 2021

(51) Int. Cl.
*A01G 18/00* (2018.01)
*A01G 9/24* (2006.01)
*A01G 18/65* (2018.01)
*A01G 18/69* (2018.01)

(52) U.S. Cl.
CPC ............. *A01G 18/65* (2018.02); *A01G 9/245* (2013.01); *A01G 9/246* (2013.01); *A01G 9/247* (2013.01); *A01G 9/249* (2019.05); *A01G 18/69* (2018.02)

(58) Field of Classification Search
CPC ........ A01G 18/65; A01G 18/69; A01G 18/00; A01G 9/247; A01G 31/02; A01G 2031/006
See application file for complete search history.

(56) References Cited

U.S. PATENT DOCUMENTS

2011/0056132 A1\* 3/2011 Gardner ................ A01G 31/02
47/66.7
2018/0007845 A1\* 1/2018 Martin ................... A01G 31/06

\* cited by examiner

*Primary Examiner* — Monica L Perry
(74) *Attorney, Agent, or Firm* — Leavitt Eldredge Law Firm

(57) ABSTRACT

A growing system includes a tub having a lid attached thereto, the tub having an interior area; a tubing system secured within the interior area of the tub; a fluid reservoir housing a fluid pump, the fluid pump in fluid communication with the tubing system; a water tank positioned within the interior area of the tub and having a water level sensor therein; one or more lights configured to emit light into the interior area; a heat pump to emit heat into the interior area; a thermocouple and hygrometer to measure temperature and humidity within the interior area of the tub; and a controller having one or more controls to receive user commands to operate the fluid pump, the one or more lights, and the heat pump; the controller operates to control a microclimate within the interior area of the tub based on user preferences.

7 Claims, 4 Drawing Sheets

GROWING DEVICE

BACKGROUND

1. Field of the Invention

The present invention relates generally to growing systems, and more specifically, to a growing device specifically adapted to create an optimal microclimate for indoor fungi horticulture.

2. Description of Related Art

Growing systems are well known in the art and are used to grow plants both indoors and outdoors. Some plants require specific environments to thrive. Specifically, when growing fungi, the entire spectrum of critical parameters such as lighting, temperature, air quality (contaminants and $CO_2$ levels), and humidity must all be controlled within tight tolerances, which require constant monitoring and adjustment.

This presents a problem to individuals wanting to participate in mushroom horticulture but lack the expertise and time to commit to what is currently a time-consuming process.

Accordingly, it is an object of the present invention to provide for an electrically driven, and scalable, microclimate for fungi horticulture, wherein the invention monitors temperature, humidity, air quality, and lighting in real time and automatically adjusts according to user-defined parameters. In some embodiments, the present invention will be controlled remotely through a smartphone or other remote device using wireless and Bluetooth connections.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
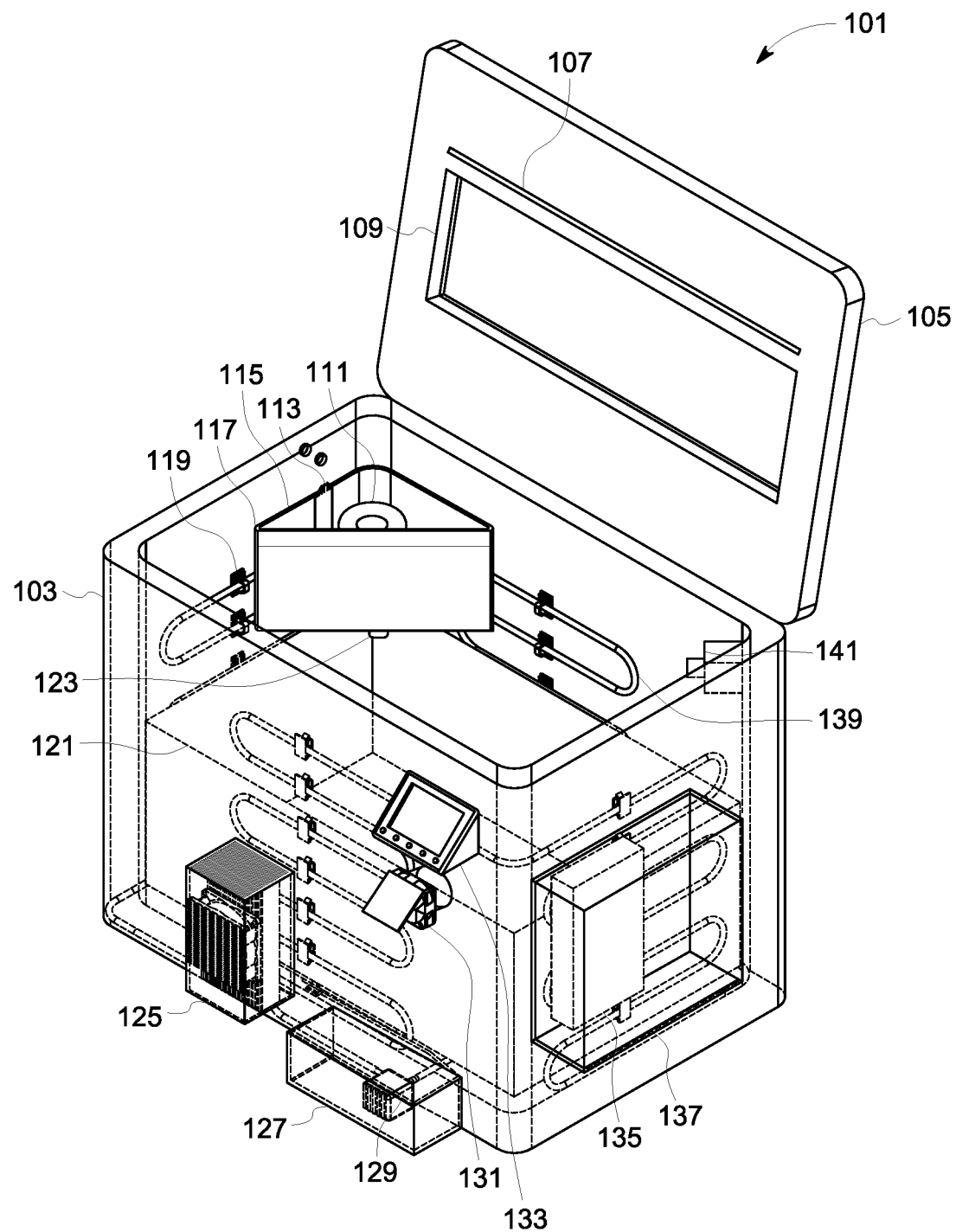
FIG. 1 is an open isometric view of a growing device in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional growing systems. Specifically, the present invention provides for perfect microclimate control for indoor horticulture, specifically, the present invention provides for control of parameters such as lighting, temperature, air quality, and humidity. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-4 depict various views of a growing system 101 and the components thereof, in accordance with a preferred embodiment of the present application. It will be appreciated that system 101 overcomes one or more of the above-listed problems commonly associated with conventional growing systems. Specifically, the present invention provides for a perfectly controlled microclimate for use in growing fungi, wherein the user will not have to spend exorbitant amounts of time altering and controlling the climate.

In the contemplated embodiment, system 101 includes a tub 103 having a lid 105 attached thereto to create an interior area, wherein the tub is insulated and airtight or near air tight. As shown, in the preferred embodiment, the lid 105 includes a window 109 which provides for viewing access of the interior area of the tub. The window may be covered as desired such as during some growing times of the fungi. It should be appreciated that the overall size and shape can vary as aesthetical or functional considerations require.

System 101 further includes one or more lights 107 which may be positioned on the inside of the lid as shown. The lights may vary as is known in the art, but in at least one contemplated embodiment, the lights are LED lights, preferably an adhesive LED strip of preferably 12V DC 6500 Kelvin LED's or LED's with an adjustable color temperature to meet the lighting preferences of different strains and species of fungi. It should further be appreciated that there may be multiple lights as desired.

Tubing 139 is shown and is attached to the interior area of the tub, wherein the tubing may extend around most of the parameter of the tub, wherein the tubing provides for fluid flow therethrough. The tubing 139 may be attached by any known means, however, in the preferred embodiment, cable ties 119 are used for securement.

The tubing 139 is in fluid communication with a fluid pump 129 via a fluid reservoir housing 127. These components may vary, however, in one contemplated embodiment the fluid reservoir is made of plastic or corrosion resistant metal or non-corrosion resistant metal with anti-corrosion coating. It needs to have an inlet and outlet hole in the sides that allow for tubing to connect to fluid pump that sits inside the reservoir. The sides of the reservoir need to be tall enough so that when filled with fluid such as water or other coolant, the fluid level is well above pump to prevent air locking. The volume of the reservoir is preferably around 40 cubic inches. The fluid pump 129 is a small, preferably 12V DC pump that sits inside fluid reservoir and connects its inlet and outlet to tubing.

As shown, a water tank 117, which may be positioned within the interior area of the tub and mounted at the top of the tub, wherein the water can then flow down to fungi contained therein. The water tank may be positioned in the corner as shown, or in various other locations within the interior of the tub. The water tank may house a humidifier 111 which will be configured to emit humidity into the tub as needed. In addition, a water level sensor 113 will be provided along a side 115 of the tank, thereby providing for a reading associated with the level of water held in the tank. The water tank is positioned so that the top of water tank does not touch the lid of insulated tub.

In some embodiments, a thermocouple and hygrometer 123 will further be provided. Preferably a 3V-5V ASAIR DHT22 is used to measure the temperature and humidity inside insulated tub, such that the temperature and humidity can be adjusted as needed.

As shown, a fan 131 is positioned adjacent to a controller 133. The controller 133 comprises an LCD or digital readout screen, selector buttons, a protective housing, and a main power switch. As shown, in the preferred embodiment, the controller is placed on the outside of the tub. The fan may be a small fan or blower that is preferably 12V DC and 1.5"-3" square and has a volumetric flow rate of preferably 2-5 CFM. The controller will be in communication with the various other components, such that the components can be controlled via the controller.

The system can further include one or more cameras 141, which are Bluetooth Cameras or components that are preferably 5V-12V DC that allow wireless connection to a camera through Bluetooth connectivity capabilities such as the Arduino UNO board, HiLetgo HC-05 Wireless Bluetooth RF Transceiver, and the WINGONEER 0.3 OV7670 CMOS camera module. The one or more cameras will provide for visibility of the interior of the tub and can be in communication with the controller.

As further shown, system 101 may include an electrical box 137. The electrical box in the preferred embodiment is made of plastic or corrosion resistant metal or non-corrosion resistant metal with anti-corrosion coating. It houses a power supply, microcontroller 135, relays, and voltage regulator. Power supply has an input of preferably 110V-220V AC and an output of preferably 12V 30+Amp DC. Microcontroller such as the Arduino UNO or Arduino NANO equipped with wireless and/or Bluetooth connectivity. Relays or h-bridges such as 2-channel 5V DC relays are used to switch the polarity of Peltier device 15. Each Peltier device, as more than one can be used for increased thermal management performance, requires 2-channels to effectively switch the polarity of the DC signal.

Figure 2:
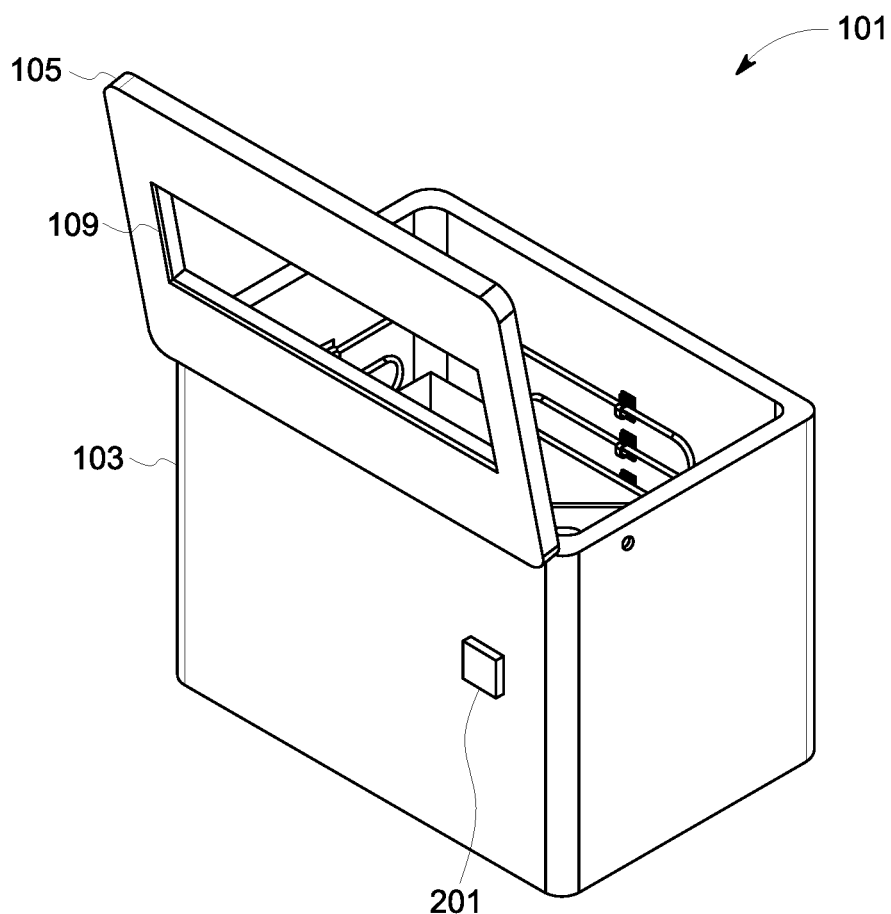
FIG. 2 is an open isometric back view of the device of FIG. 1.

As best shown in FIG. 2, the system 101 will further include an air filter 201 positioned on the back side of the tub, wherein the air filter is a preferably 3" square of preferably HEPA standards used to filter out contaminants from the exterior of insulated tub 103 during necessary fresh air exchanges. The air filter 201 is positioned opposite an exhaust fan (not shown). The air filter again can be positioned in various locations and can be various sizes.

Figure 3:
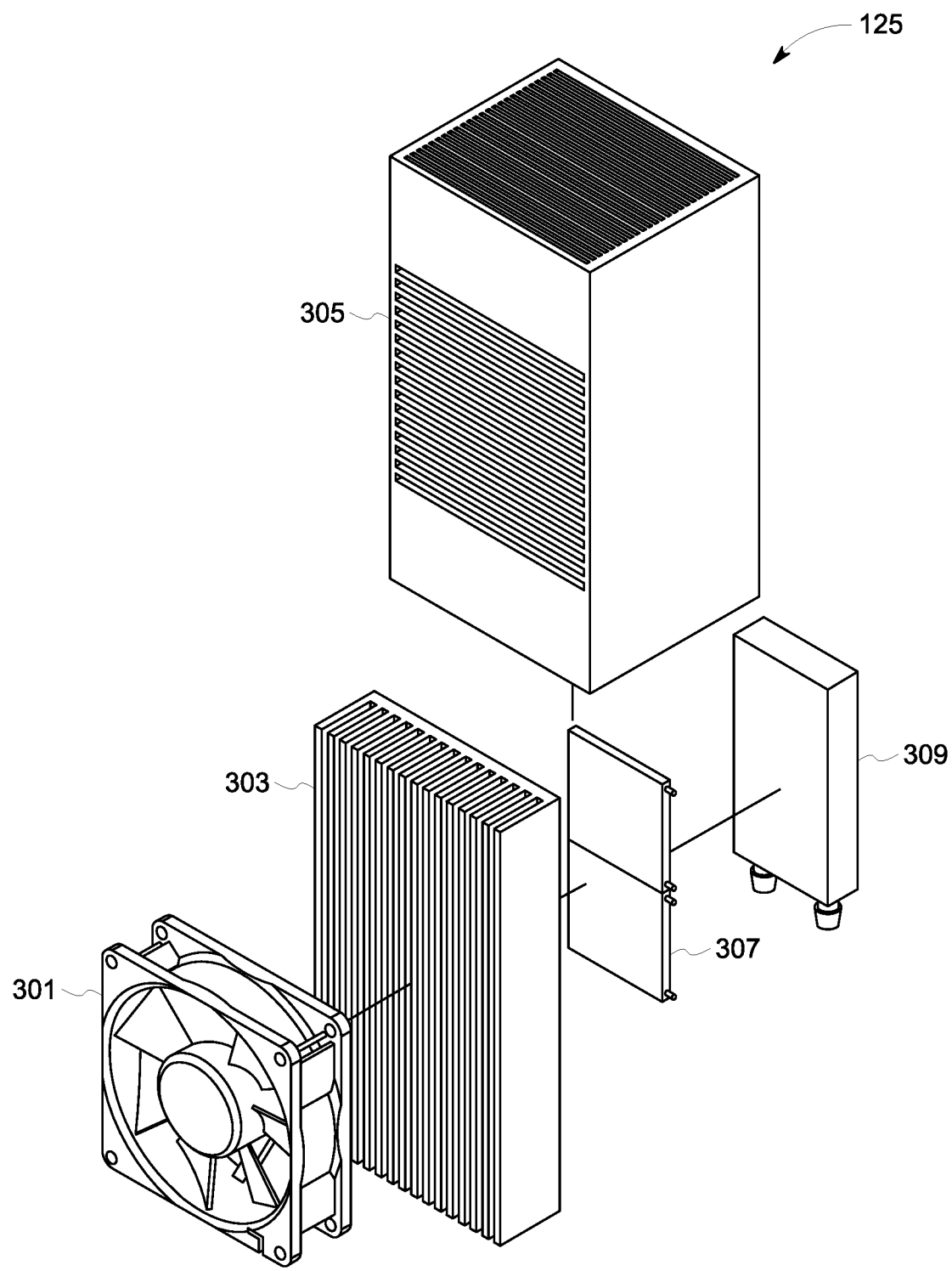
FIG. 3 is an isometric expanded view of the heat pump in accordance with the present application.

As shown in FIG. 3, the system includes a heat pump 125, which is further composed of a fan or blower 301, fluid block 309, Peltier device 307, heat sink 303, and protective housing 305. The Peltier Device or multiple Peltier devices such as the TEC1-12706 that have a total power consumption of preferably 140 Watts. Heat Sink made of a thermally conductive material such as aluminum or copper with dimensions that are preferably 4.75"×3.25"×1.25". The fluid cooling/heating block is made of a thermally conductive material such as aluminum or copper with an inlet and outlet port. It has a switchback channel inside that connects the inlet and outlet ports. Its length and width is preferably equal to the length and width of Peltier device. The fan is a high volume fan, preferably 5V-12V DC, with a volumetric flow rate of preferably 40+CFM and dimensions that are comparatively similar to heat sink.

Figure 4:
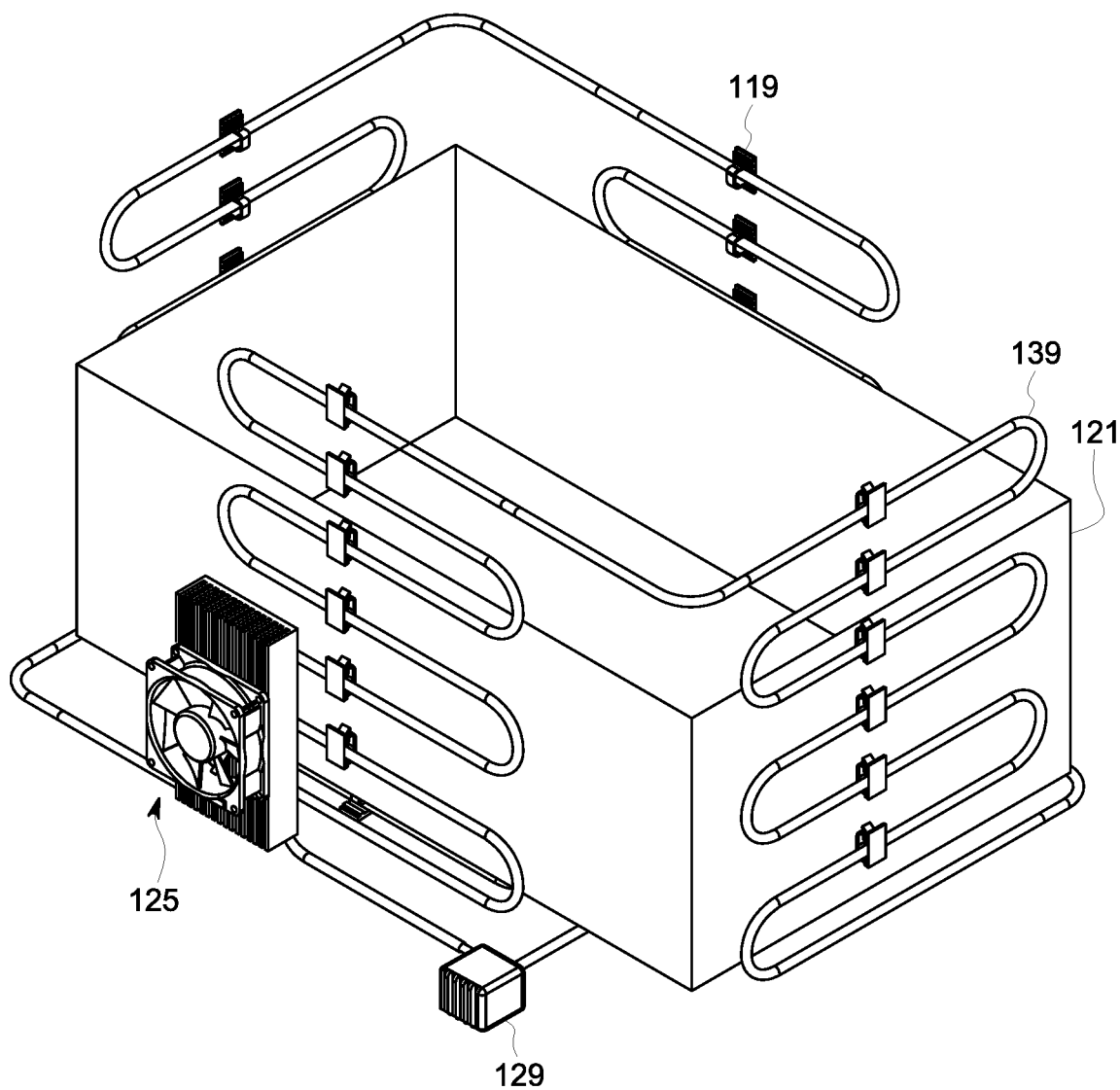
FIG. 4 is a front isometric view of the heat pump components and tubing in accordance with the present application.

As best shown in FIG. 4, the system 101 further includes a liner 121, wherein the liner is made of a thin plastic and can be easily made out of a 0.002"-0.003" garbage bag. The liner is positioned to provide a barrier between fungi growing substrate and the tub. The liner can be removed and replaced as desired and needed by the user.

It should be appreciated that during use, the controller will receive information and provide commands to the various components, such as the fluid pump, the one or more lights, the heat pump, such that the controller is used to control the climate of the tub precisely for the growing of fungi therein.

The system may require various additional components, such as a voltage regulator, such as STMicroelectronics L7805CV is used to regulate the 12 VDC voltage from power supply to 5 VDC for microcontroller. Insulated electrical wiring is used to connect all electrical components as necessary. Preferably 15 AWG.

The controller may be configured to wirelessly communicate with a device, such as a mobile device, to receive commands therefrom.

The tubing may be made of copper, aluminum, or other thermally conductive material and is plumbed in switchbacks along the inner walls and bottom of thermally insulated tub with outlet of tubing terminating on outside of insulated tub. The outlet of tubing 139 connects to inlet of fluid cooling and heating block 309 (See FIG. 3). A section of tubing 139 runs from outlet of fluid block 309 into fluid reservoir 127 containing fluid and connects to inlet of fluid pump 129 inside fluid reservoir 127. Outlet of fluid pump 129 is connected to inlet of tubing 139, making a closed loop fluid pumping system. One major face of fluid block 309 is adhered to one major face of Peltier device 307 with thermal adhesive paste or tape. The opposite major face of Peltier device 307 is adhered to major flat face of heat sink 303 made of copper, aluminum, or other thermally conductive material so that Peltier device 307 is sandwiched between heat sink 303 and fluid block 309. Fan or blower 301 is secured to fin side of heat sink 303 to move air across fins of heat sink During operation of the system 101, the user will properly prepare their fungi growing substrate and properly transport their growing substrate into this automated programmable fungi growing device, they input all growing parameters through controller 133, and in some embodiments, a mobile device with wireless communication. The user may set a time and date if desired and further will set environmental parameters, such as temperature, humidity set points, lighting schedule, and fresh air exchange schedule.

The controller will automatically turn components of the system on and off as needed to maintain the user set parameters.

For example, if ambient temperature inside insulated tub, measured in real time through thermocouple, is higher than user defined temperature set point, then the fluid pump 129 and fan 301 turn on. The one or more relays will be used to switch power on in the heat pump 125 so that current through the Peltier device 307 causes the fluid block 309 side of the Peltier device to cool, thus cooling the fluid in the tubing 139 and creating a refrigeration source inside of the tub. Cooling continues until ambient temperature inside the tub reaches user defined temperature set point, at which point fluid pump 129 and heat pump 125 shut off.

If ambient temperature inside the tub is lower than user defined temperature set point, then fluid pump 129 and fan 301 turn on and relays switch power on in heat pump 125 so that current flows through the Peltier device 307 in heat pump 125 in the reverse direction of cooling mode and causes the fluid block 309 side of the Peltier device to heat, thus heating the fluid in the tubing and creating a heat source inside the insulated tub. Heating continues until ambient temperature inside the tub reaches user defined temperature set point.

This invention removes the user requirement to make themselves available to constantly monitor and manually adjust the microclimate system. This invention provides an easily programmable system to automatically monitor and adjust microclimate characteristics according to user-defined parameters. This device can be used in applications where environmental control i.e. temperature, humidity, fresh air exchange, CO2 and lighting are necessary such as growing various plants, fungi, animals, and other organisms. This device can be used as a fruiting chamber for grains, substrates, and other materials and growing methods such as spawn bags, jars, and other containers that have already been inoculated and colonized with fungi and are ready to fruit. This device can also be used to cure various materials and adhesives that require curing in a controlled environment such as various concrete compositions and epoxies.

It should be appreciated that various modifications can be made to the system of the present invention. The system may utilize wireless or Bluetooth technology, or may alternatively function without. The cooling of the tub may be accomplished by storing the tub in an environment wherein the ambient temperature outside of the tub is below user defined temperature set point, and then drawing cool air into the tub by turning on the exhaust fan. Heat exchange both into and out of the system can also be accomplished through a heat pump system that utilizes a compressed refrigerant the likes of which is commonly seen in household appliances like refrigerators and air condition units. Heating of the tub can also be accomplished through electrically resistive elements used to generate heat in place of the tubing. Temperature and humidity controllers, that utilize sensors, may be able to replace the thermocouple and the hygrometer by being used in connection with exterior heating and cooling sources, such as air conditioning units and heaters, wherein the external heating or cooling sources are turned on and off as needed based on sensor readings. Similarly, an internal device may be added inside of the tub and connected to the controller. Yet further, a device such as a mist humidifier can be placed externally to the tub and connected to the controller, wherein the controller will activate humidity increases as necessary based on user parameters.

In some embodiments, a more robust CO2 control method may be desired. This may then be accomplished with an external CO2 source, preferably a CO2 bottle, that is connected to a CO2 regulator and electronic valve. A CO2 sensor is used inside the tub to read the CO2 levels inside the tub and is connected to the microcontroller. The microcontroller also controls the relay that switches the regulator and valve open and close. The user defines the CO2 set points through the microcontroller. If CO2 levels increase past the point of user defined CO2 levels, then the exhaust fan turns on and introduces fresh air to the tub, thereby lowering CO2 levels inside the tub to the desired user defined set point. If CO2 levels inside the tub drop below user defined set point, then the CO2 valve opens and introduces CO2 into the tub until CO2 levels reach the user defined set point.

Plastic grates that are preferably no more than ½" thick with ⅜" cells can be used on the bottom and sides of the tub to create an additional barrier between the liner and tubing. This may be desirable if users are using certain substrates that dry out easily and they want an additional layer between their substrate and tubing.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A growing system, comprising:
   a tub having a lid attached thereto, the tub having an interior area, the lid having a window that enables a user to view the interior area;
   a removable liner positioned within the interior area;
   a tubing system secured within the interior area of the tub;
   a fluid reservoir housing a fluid pump, the fluid pump in fluid communication with the tubing system;
   a water tank in fluid communication with the interior of the tub and having a water level sensor therein, the water tank is positioned above the removable liner and below the lid;
   one or more lights configured to emit light into the interior area, the one or more lights are secured to the lid;
   a heat pump configured to exchange heat from an exterior of the tub to the interior area;
   a thermocouple and hygrometer configured to measure temperature and humidity within the interior area of the tub; and
   a controller having one or more controls and configured to receive user commands to operate the fluid pump, the one or more lights, and the heat pump;

wherein the controller operates to control a microclimate within the interior area of the tub based on user preferences.

2. The system of claim 1, further comprising:
a fan in communication with the controller, wherein the fan is configured to provide airflow within the interior area of the tub.

3. The system of claim 1, further comprising:
a camera in communication with the controller and configured to provide a visual depiction of the interior area of the tub.

4. The system of claim 1, wherein the heat pump further comprises:
a Peltier device;
a heat sink
a fluid cooling or heating block; and
a fan;
wherein the Peltier device is positioned between the heat sink and the fluid cooling or heating block; and
wherein the fan is positioned against the heat sink opposite of the Peltier device.

5. The system of claim 4, wherein the heat pump is housed within a heat pump housing.

6. The system of claim 1, further comprising:
a microcontroller configured to provide for wireless communication to the controller.

7. The system of claim 1, further comprising:
an air filter incorporated into the tub.

\* \* \* \* \*